United States Patent [19]

Janiszewski

[11] Patent Number: 5,067,364

[45] Date of Patent: Nov. 26, 1991

[54] DEVICE FOR ELIMINATING RATTLE IN A GEAR BOX

[75] Inventor: Grzegorz Janiszewski, Angered, Sweden

[73] Assignee: AB Volvo, Gothenburg, Sweden

[21] Appl. No.: 438,406

[22] PCT Filed: Apr. 26, 1989

[86] PCT No.: PCT/SE89/00233

§ 371 Date: Dec. 20, 1989

§ 102(e) Date: Dec. 20, 1989

[87] PCT Pub. No.: WO89/10504

PCT Pub. Date: Nov. 2, 1989

[30] Foreign Application Priority Data

Apr. 26, 1988 [SE] Sweden ............................ 8801557

[51] Int. Cl.$^5$ .............................................. F16H 55/18
[52] U.S. Cl. ........................................ 74/440; 74/409
[58] Field of Search ............................ 74/409, 440

[56] References Cited

U.S. PATENT DOCUMENTS

| | | | |
|---|---|---|---|
| 1,033,468 | 7/1912 | Raymond | 74/440 |
| 1,334,517 | 3/1920 | Bryan | 74/440 |
| 1,539,149 | 5/1925 | Thornburg | 74/440 |
| 1,647,480 | 11/1927 | Starkey | 74/440 |
| 2,343,110 | 2/1944 | Hale | 74/440 |
| 2,607,238 | 8/1952 | English et al. | 74/440 |
| 2,845,809 | 8/1958 | Hetzel | 74/440 |
| 3,318,193 | 5/1967 | Rogg | 74/440 X |

FOREIGN PATENT DOCUMENTS

| | | |
|---|---|---|
| 0199265 | 10/1986 | European Pat. Off. |
| 2439317 | 2/1976 | Fed. Rep. of Germany |
| 2528466 | 1/1977 | Fed. Rep. of Germany |
| 2813456 | 10/1979 | Fed. Rep. of Germany |
| 979448 | 12/1950 | France .................. 74/440 |
| 60-95272 | 5/1985 | Japan ..................... 74/440 |

Primary Examiner—Allan D. Herrmann
Attorney, Agent, or Firm—Young & Thompson

[57] ABSTRACT

A device for reducing mechanical rattle between a pair of interengaging gears, comprising a gear element cooperating with one gear, this gear element being rotatably mounted on a hub portion joined to the one gear, having the same tooth profile and number of teeth as the one gear and being connected to the one gear via rotationally resilient elements, which are pre-tensioned in an engagement position of the gears. The resilient elements comprise elastic elements (13; 20) which are disposed in opposing, circumferentially spaced cavities (11, 12) in the hub portion (9) and in a circumferentially inner surface of the gear element (8) that faces the hub portion (9) disposed to keep the gear element and the one gear angularly displaced relatively to each other before they are brought into engagement with the other of the pair of interengaging gears. The cavities (12) in the hub portion (9) are arcuate, as viewed in a radial plane, while the cavities (11) in the gear element (8) have a first limiting surface (11a) which is tangential relative to a circumference of the hub, and a second limiting surface (11b) which extends essentially perpendicular to and radially inward from a radially outer end of the first limiting surface. The resilient elements are elastic elements (20) of rubber or a rubber-like material.

3 Claims, 1 Drawing Sheet

DEVICE FOR ELIMINATING RATTLE IN A GEAR BOX

The present invention relates to a device for eliminating mechanical rattle between a pair of inter-engaging gears, comprising a gear element cooperating with one gear, said gear element being rotatably mounted on a hub portion joined to said one gear, having the same tooth profile and number of teeth as the gear and being connected to the gear via rotationally resilient elements, which are pre-tensioned in the engagement position of the gears.

In most autombiles with a manual transmission there is a mechanical rattle when idling. The noise is produced when the teeth of the gears strike each other at a certain frequency since the gears in the gear box are imparted an acceleration due to the non-uniform running of the engine at low rpm. The oscillations which are produced are transmitted via the clutch and the input shaft and are caused not only by the engine but also the drag torque of the gear box. The engine flywheel has a greater angular acceleration and oscillation amplitude at low engine speeds, so that idle rattle increases in most cases with decreasing rpm. A low idling rpm is, however in general desirable since it improves fuel economy.

Several different methods of reducing or completely eliminating idling rattle in gear boxes are known. It is for example possible to use clutches with special stiffness and dampening, to increase the moment of intertia of the flywheel of to reduce the backlash between the gears. It is also possible to use friction brake in the gear box, to pre-tension the gears or alter their moments of inertia. In most cases these methods are either not sufficiently effective for reducing rattle or they are expensive since they require relatively extensive modifications of existing components. As regards the reduction of backlash, it is for example not practically possible to achieve a small enough play to provide effective reduction of rattle. The pre-tensioning devices hitherto brought into use have had a tendency to produce their own additional noises.

By means of a device of the tape described in the introduction, which is known by for example EP 0 199 265, it is possible to achive an effect which is nearly the same as when the backlash between the gears is practically completely eliminated. The known device has gear members interconnected with the aid of a pre-tensioned leaf spring fixed between pins, said spring being housed in a space formed by grooves in opposing sides of gear members. Such a device is relatively complicated to manufacture and assemble and there is a risk that it will produce its own rattle, especially when wear has caused play in the spring mounting.

The purpose of the present invention is to acheive a device of the type described in the introduction, which is sinple and inexpensive to manufacture and assemble and which eliminates the risk of producing its own noise.

This is achieved according to the invention by virtue of the fact that the resilient elements comprise elastic elements which are disposed in opposing, circumferentially spaced cavities in the hub portion and in the circumferential inner surface facing the hub of gear elements and are disposed to keep the gear elements and said one gear angularly displaced relative to each other before they are brought into engagement with the other gear.

The device according to the invention has a low production cost and is simple to assemble. The cavities in the gear hub and the gear element, respectively, can be produced by simple milling operations. By virtue of the fact that the cavities lie in the radially inner protion of the gear, they do not affect the tooth shape during the quenching process. Assembly is simplified by virtue of the fact that the elastic elements can in principle lie loosely in the cavities. The device produces no noise by itself if elastic elements of rubber are used, which elements not only provide a pre-tensioning torque but also attenuate oscillations.

The invention is described in more detail below with reference to an example shown in the accompanying drawings, where FIG. 1 shows a sectional view of a portion of a gear box with a device according to the invention.

Figure 1:
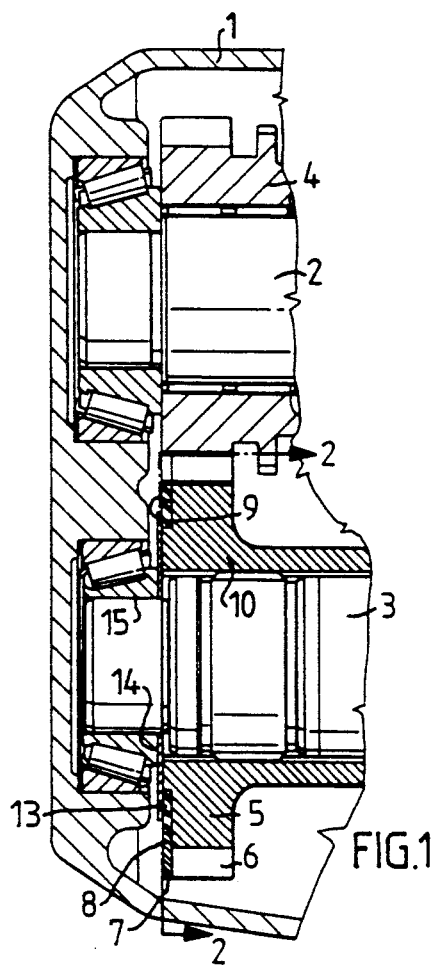

In FIG. 1, 1 designates a portion of a gear box housing, in which two shafts 2, 3 are rotatably mounted. The shafts carry individual gears 4, 5, which engage each other. Gear 4 is rotatably mounted on its shaft 2 and is lockable and releasable by means of an engaging sleeve (not shown), while the gear 5 is non-rotatably fixed on its shaft 3.

Figure 4:
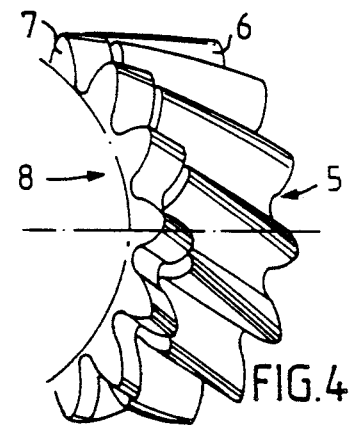
FIG. 4 shows a perspective view of a portion of the gear in FIG. 2.

As is most clearly shown in FIG. 4, the gear 5 is divided into parts 6, 7. The gear portion 7 is in the form of a thin annular disc 8, while the gear portion 6 is a portion of the gear proper 5. The disc 8 is rotatably mounted on a shoulder 9 in the hub portion 10 of the gear 5. Cavities 11 and 12 in the inner edge of the disc 8 and in the shoulder 9 house rubber elements 13, which form the resilient elements, against the force of which the disc 8 is rotatable relative to the gear 5. A thin plate 14 between the hub portion 10 of the gear 5 and an adjacent bearing 15 fixes the disc 8 and the rubber elements 13 axially relative to the gear 5. The rubber elements 13 can be losely placed or fixed by heat into the cavities 11, 12.

The cavities 11, 12 are so arranged relative to the gear protions 6 and 7 that, when the disc is mounted in place on the shoulder 9 and the rubber elements 13 are laid into the cavities, but before the gear 5 has been mounted into the gear box and brought into engagement with the gear 4 the gear portions 6, 7 are angularly displaced in relation to each other. This is illustrated, exaggerated to some degree for the sake of illustration, in FIG. 4. In practice, there is a lateral displacement of 1-2 mms between the teeth addenda in the gear portions 6 and 7. The main requirement is that lateral displacement between the gear portions 6, 7 is greater than the backlash between the teeth of the gears 4, 5.

Figure 3:
FIG. 3 shows a section along line 3—3 in FIG. 2.

When the gear 5 is mounted in engagement with the gear 4, the angular displacement of the disc 8 is reduced relative to the gear proper 5, which creates a pre-tensioning in the rubber elements 13. The teeth of the disc 8 will thus be constantly spring-biased so that one flank 16 (FIG. 3) will always be in contact with the opposing tooth flank of the gear 4. In this way, backlash is practically eliminated between the gears. By virtue of the fact that one flank 17 is always unloaded, it can be machined to lower requirements of precision and finishing, which reduces production costs.

Figure 6:
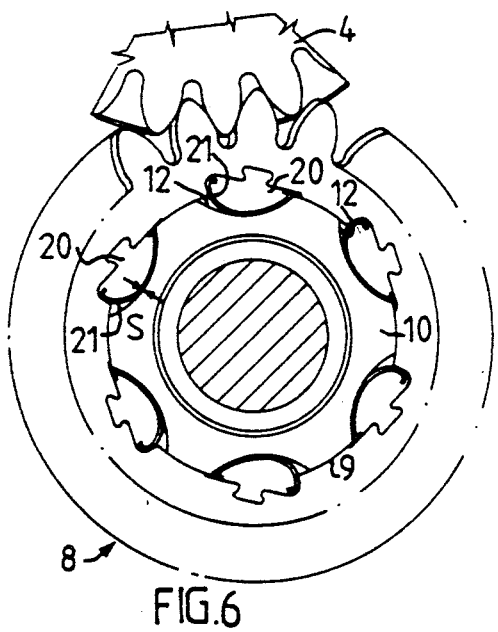
FIG. 6 shows a view of the device in FIG. 5 in a pretensioned state.
Figure 5:
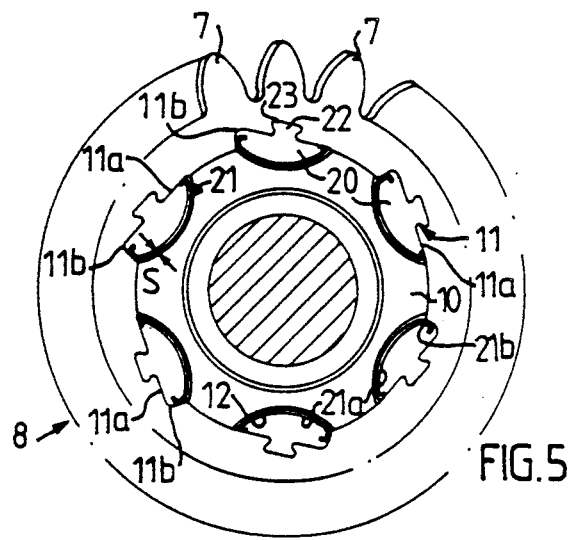
FIG. 5 is a view corresponding to FIG. 2 of a preferred embodiment of the device according to the invention in an unloaded state.

The embodiment shown in FIGS. 5 and 6 differs from that described above in that the resilient elements comprise, in addition to the rubber elements 20 corresponding to the elements 13 above, metal leaf springs 21 as well. The elements 20 are made with projections 22 extending into dove tail grooves 23 in the disc 8. The leaf springs 21 are fused to the rubber elements 20 and the resilient elements consisting of the parts 20, 21 are held together in place in the disc 8 by the projections 22 and the cavities 23 when mounting the disc on the shoulder 9 on the gear hub 10. The cavities 12 in the hub are so dimensioned relative to the shape of the leaf springs 21 in the unloaded state, that there is a slight play "S" which facilitates assembly. This play "S" provides an expansion space for compressed rubber when pre-tensioning the resilient elements, as is evident from FIG. 6.

By dividing the resilient elements in two different components in the manner described above a device is provided in which each component can be "tailor-made" for a specific task. Thus the rubber elements 20 are primarily designed to damp oscillations, while the leaf springs 21 are primarily designed to achieve sufficiently great pre-tensioning torque.

Figure 2:
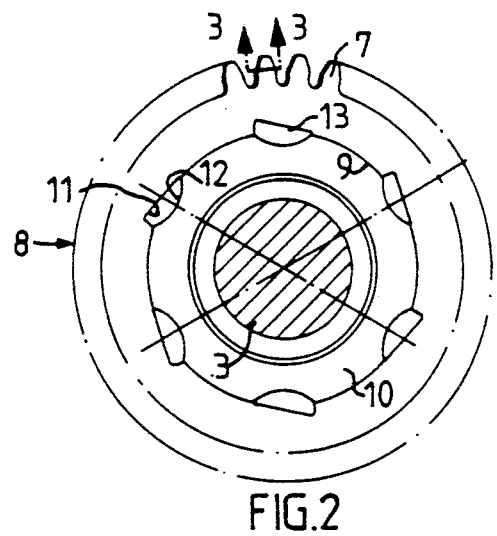
FIG. 2 shows a section along the line 2—2 in FIG. 1.

As can be seen in FIGS. 2, 5 and 6, the cavities 12 in the shoulder portion 9 of the hub are arcuate. The cavities 11 in the gear disc 8 have a bottom portion 11a which extends essentially tangentially to the hub portion 9, and a rear wall 11b, which extends essentially perpendicular to the bottom portion 11a. Each leaf spring 21 has a portion 21a with a shape adapted to the arc of the cavity 12 and an adjacent portion 21b extending into the cavity 11, which abuts the rear wall 11b.

Trials over long periods of time have shown that the design described fulfills useful life requirements as regards rattle elimination and resilience and the device produces no noise of its own even after extended use.

I claim:

1. In a device for reducing mechanical rattle between a pairt of interengaging gears, comprising a gear element cooperating with one gear, said gear elements being rotatably mounted on a hub portion joined to said one gear having the same tooth profile and number of teeth as said one gear and being connected to said one gear via rotationally resilient elements, which are pre-tensioned in an engagement position of gears; the improvement wherein said resilient elements comprise elastic elements (13; 20) which are disposed in opposing, circumferentially spaced cavities (11, 12) in said hub portion (9) and in a circumferentially inner surface of said gear element (8) that faces said hub portion (9) disposed to keep said gear elements and said one gear angularly displaced relatively to each other before they are brought into engagement with the other of said pair of interengaging gears, said cavities (12) in said portion (9) being arcuate, as viewed in a radial plane, while said cavities (11) in said gear element (8) have a first limiting surface (11a) which is tangential relative to a circumference of the hub, and a second limiting surface (11b) which extends essentially perpendicular to and radially inward from a radially outer end of said first limiting surface.

2. Device according to claim 1 wherein said resilient elements comprise, firstly an elastic element (20) of rubber or rubber-like material and secondly a metal leaf spring (21) which abuts against a side of said elastic element facing said cavity (12) in said hub portion (9).

3. Device according to claim 2, wherein said leaf spring (21) has a portion (21a) with an arcuate shape of said cavity (12) in said hub portion (9) and an adjoining portion (21b) extending into said cavity (11) in said gear element (8), said adjoining portion (21b) abutting against said second limiting surface (11b) of said cavity (11) in said gear element (8).

* * * * *